No. 662,139. Patented Nov. 20, 1900.
E. A. WARREN.
ARTIFICIAL BAIT FOR FISHING.
(Application filed May 18, 1900.)

(No Model.)

Witnesses:-
George Barry Jr
Edward Vieser.

Inventor:-
Edmond A. Warren
By attorneys
Brown & Seward

UNITED STATES PATENT OFFICE.

EDMOND A. WARREN, OF NEW YORK, N. Y., ASSIGNOR TO EDMOND A. WARREN AND THOMAS J. MOORE, OF SAME PLACE.

ARTIFICIAL BAIT FOR FISHING.

SPECIFICATION forming part of Letters Patent No. 662,139, dated November 20, 1900.

Application filed May 18, 1900. Serial No. 17,091. (No model.)

*To all whom it may concern:*

Be it known that I, EDMOND A. WARREN, a citizen of the United States, and a resident of the borough of Brooklyn, in the city and State of New York, have invented a new and useful Improvement in Artificial Bait for Fishing, of which the following is a specification.

An artificial bait embodying my invention comprises a fish-hook, an artificial fly, and an artificial worm, combined as hereinafter described and claimed.

Figure 1:
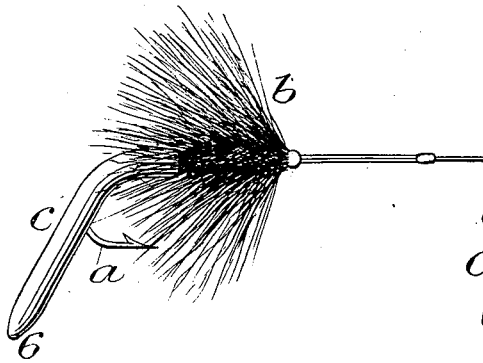
Figure 2:
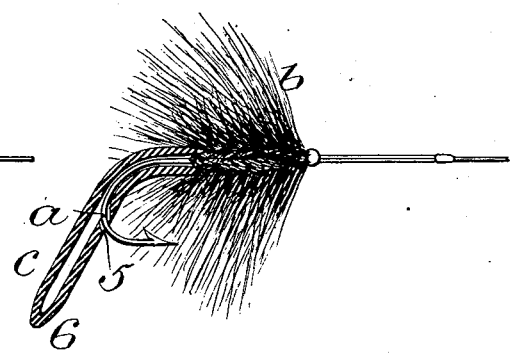
Figure 3:
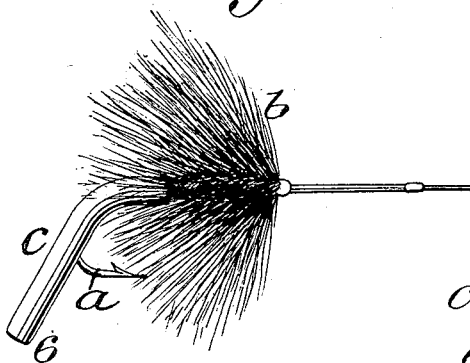

Figure 1 of the drawings represents a side view of one example of my artificial bait, and Fig. 2 a sectional view of the same. Fig. 3 is a side view of another example, and Fig. 4 a sectional view of the same.

Similar letters and numbers of reference designate corresponding parts in all of the figures.

$a$ is the fish-hook, to the shank of which is secured in the usual or any suitable manner a tuft $b$, of fur, feathers, or any suitable material, artificially representing a fly. Over the bend of the hook and projecting beyond the barb thereof there is placed a tubular sheath $c$, of any suitable material, preferably flexible, as india-rubber, of any suitable color, as red, artificially representing a worm or a portion thereof, the point and barb of the hook projecting through an orifice 5 in the said sheath at a distance from its projecting end 6.

In the example represented in Figs. 1 and 2 the sheath or tube $c$ is closed and rounded or pointed at its projecting end to represent the head or tail of a worm.

Figure 4:
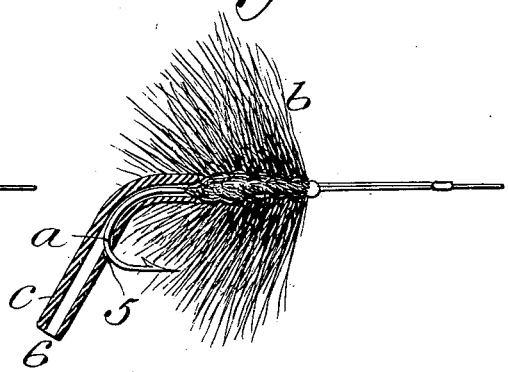

In the example represented in Figs. 3 and 4 the tube $c$ is a piece cut from a length of tubing and open at both ends.

In both examples the tubular sheath completely incases and conceals nearly all of the curved portion of the hook, leaving only the reverted and barbed portion and the point of the latter projecting through the orifice 5.

What I claim as my invention is—

The combination of a fish-hook, a tuft representing a fly on the shank of said hook, and a tubular sheath which incases the bend of said hook and a part of the shank thereof and which projects beyond the bend thereof and in which is an orifice through which the barb and point of said hook project, substantially as herein described.

In testimony that I claim the foregoing as my invention I have signed my name, in presence of two witnesses, this 15th day of May, 1900.

EDMOND A. WARREN.

Witnesses:
 FREDK. HAYNES,
 EDWARD VIESER.